United States Patent [19]

Bridges et al.

[11] Patent Number: 4,583,257
[45] Date of Patent: Apr. 22, 1986

[54] WELDING TORCH CLEANER FOR ROBOTIC WELDING

[75] Inventors: Edward W. Bridges, Springfields; Charles R. Winterford, Putnoe, both of England

[73] Assignee: Cincinnati Milacron Inc., Cincinnati, Ohio

[21] Appl. No.: 701,832

[22] Filed: Feb. 14, 1985

[51] Int. Cl.⁴ .............................................. B08B 9/00
[52] U.S. Cl. .................................. 15/93 R; 15/21 E; 15/268; 408/67; 408/114; 408/130
[58] Field of Search .................. 15/93 R, 21 R, 21 E, 15/268; 228/18, 57; 408/67, 112, 114, 130, 136

[56] References Cited

U.S. PATENT DOCUMENTS

| | | | |
|---|---|---|---|
| 1,201,050 | 10/1916 | Huff | 408/136 |
| 3,362,447 | 1/1968 | Elder, Jr. | 408/112 |
| 4,469,043 | 9/1984 | Kohler et al. | 15/93 R X |

Primary Examiner—Edward L. Roberts
Attorney, Agent, or Firm—Thomas M. Farrell

[57] ABSTRACT

A baseplate carries an axially-advanceable rotating cutter. A V-block and clamp head are aligned on the plate to locate and secure a robot-positioned welding torch nozzle in a vertical attitude. After clamping the nozzle in position, the rotating cutter is advanced into the nozzle bore to remove accumulated internal weld spatter. The machined-away weld spatter can therefore be discharged under the influence of gravity or by a blast of purging air applied to the torch nozzle.

2 Claims, 4 Drawing Figures

WELDING TORCH CLEANER FOR ROBOTIC WELDING

BACKGROUND OF THE INVENTION

The invention relates generally to devices for cleaning welding torch nozzles, particularly those welding torches which employ wire-fed welding rods through the center of the torch.

The invention relates more specifically to a wire feed welding torch system used in conjunction with an automatic manipulator, or welding robot.

Wire feed welding torches of the TIG and MIG type employ a device for welding which consists generally of a tubular body through the center of which is fed the welding rod from a wire spool and inert gases are also fed through the body of the torch to provide a suitable welding environment. The torch body is fitted with a torch nozzle at its forward end, and the nozzle consists of a generally tubular device having a hollow inside diameter and having its outer diameter tapered to a converging end point. The nozzle is also fitted with gas outlet slots around its diameter. The nozzle or "shroud" can accumulate weld spatter around its inside surface, and the weld spatter may block the gas outlet ports and possibly interfere with the wire feed movement.

In its known in the art to sometimes apply a spray of anti-spatter compound to the inside of the welding nozzle to prevent spatter build-up. However, build-up will usually occur as time progresses.

It therefore becomes necessary to provide for some means of scraping away and removing the weld spatter from the inside of the welding nozzle of a welding robot. Most welding robots have the ability to mve the end effector and its associated welding torch through a variety of spatial orientations, so a remotely located device for removing weld spatter presents no problem of access.

A popular nozzle cleaner for robotic welding is found in the prior art devices manufactured by MTE Binzel (UK) Ltd., and illustrated in the 12 page catalogue of that company. Specifically, on page 7 of that catalogue, a nozzle cleaner for robotic welding is depicted, wherein a base frame carries a vertically oriented tube. The tube is spring-mounted to the base frame so that the tube is compliant and movable through multi-degrees of freedom. The tube carries an end sleeve at its topmost end which is spring-loaded in an axial direction into the tube. The end sleeve has a bellmouthed hole at its topmost end, which is capable of receiving the convergent outersurface of a robot welding nozzle. The lower part of the vertical tube carries a rotary motor attached to a reamer spring extending upward through the tube and end sleeve. The reamer spring performs the function of a helical auger (of the type used in augering plumbing lines). At desired clean out times, the robot presents its nozzle to the nozzle cleaner and upon engaging the bellmouthed sleeve, the reamer drive motor is switched on and causes the rotary reamer to auger out the inside of the nozzle. The Binzel cleaner is very compliant, thus accommodating positional inaccuracies in the robot device. Further, large cleaner cutting forces are not experienced by the robot welding tool, which is cantilevered from the robot base and not otherwise supported. The spring auger of the Binzel device permits removed weld spatter to fall into the spring mechanism to clear the nozzle. After the nozzle has been reamed, it is lifted from the nozzle cleaner and a blast of air is provided to clear the nozzle of any remaining spatter debris. Many Binzel devices also provide for an air-misted antispatter compound to be sprayed into the weld nozzle.

Applicant has found that for many applications, the accumulated weld spatter is resistant to dislodging by means of the relatively flimsy spring auger. Thus, it has been necessary for applicant to create a more positive and rigid nozzle cleaner for robotic welding. Applicant has obviated the difficulties inherent in the prior art device, by creation of a relatively rigid assembly which provides for clamping of a proximally positioned weld nozzle and, after clamping the nozzle into the device, a substantially rigid reamer can be moved through the interior of the weld nozzle to remove accumulated spatter.

It is therefore an object of the present invention, to provide for a substantially rigid and more reliable means for removing weld spatter from the interior of a robotic welding nozzle.

SUMMARY OF THE INVENTION

The invention is shown embodied in a robotic weld nozzle cleaner having a relatively rigid base structure placed at a predetermined location relative to a welding robot. The base carries a relatively rigid fluted cutter, rotatably carried in suitable bearing means on the base. Means is provided for reversibly moving the cutter along its axis of rotation (in the preferred embodiment, a vertical orientation), and means is provided for guiding the cutter while moving along its vertical axis. Additional means for aligning a welding torch coaxially with the cutter and for clamping the welding torch stationarily on the base is provided, wherein the means for aligning and clamping generally comprises a V-block and air activated clamp cooperating the V-block.

DESCRIPTION OF THE PREFERRED EMBODIMENT

Figure 1:
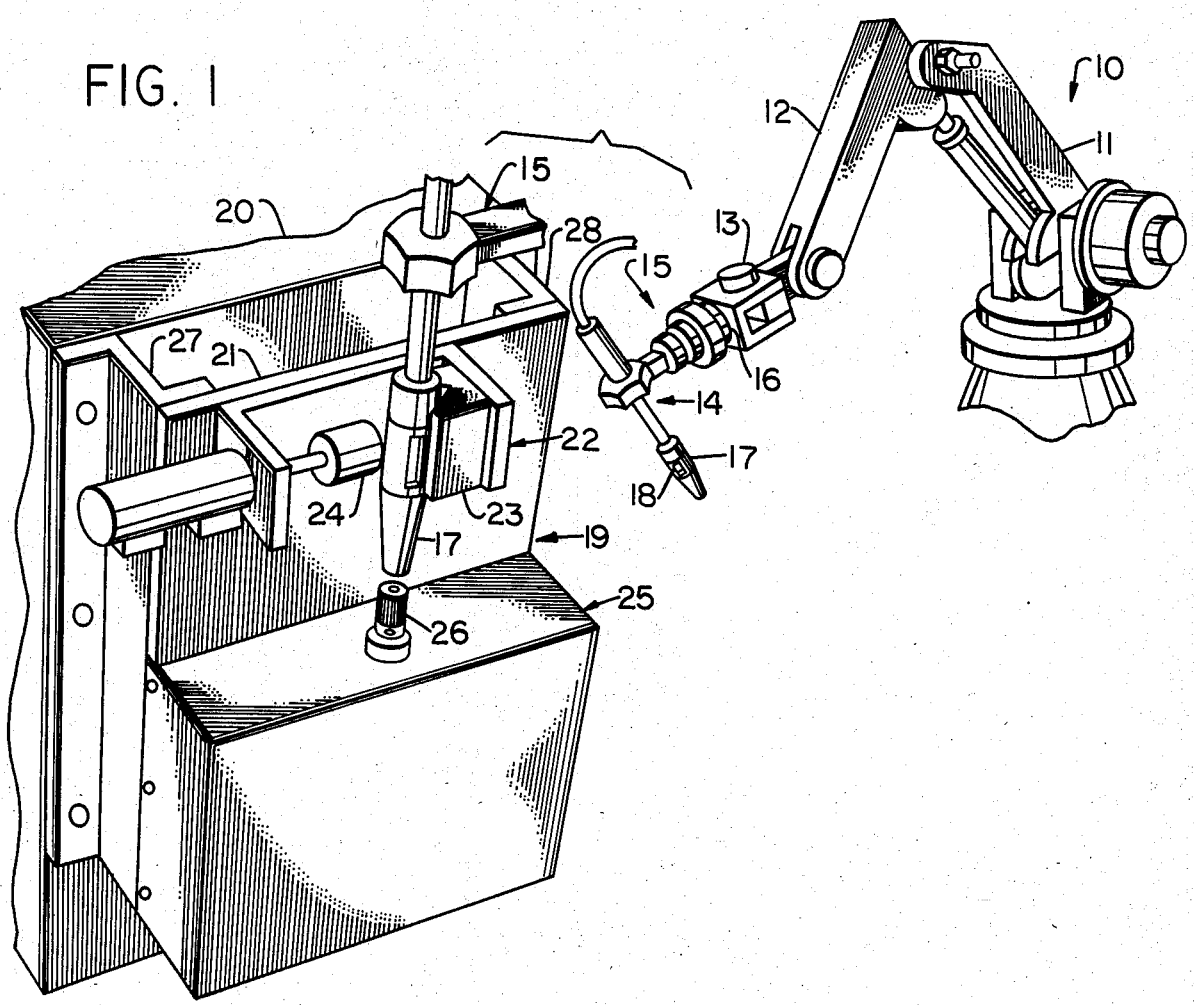
FIG. 1 is a perspective view of a welding robot and welding torch cleaner device.

Referring to the drawings and particularly to FIG. 1 thereof, there is shown an industrial robot 10 corresponding to those manufactured by Cincinnati Milacron Inc., the assignee of the present invention. The robot 10 includes an upper arm 11, a forearm 12, and a wrist unit 13, which are all independently movable according to the dictates of the robot control (not shown). The wrist unit 13 carries an industrial welding gun 14 of the wire feed type, wherein a gun mount 15 is affixed to the rotatable end effector 16 of the wrist unit 13. The gun mount 15 supports the automatic welding gun 14 which has a generally tubular construction with independent wire feed means (not shown) for feeding a consumable wire electrode through the center of the gun 14. Additionally, the gun 14 is provided with gas lines (not shown) to provide for the flow of oxygen or air when needed, and to provide an inert gaseous atmosphere at a welding site, when necessary. The general constructional details of the automatic welding gun 14 are omitted since they do not form part of the invention and are well-known in the art. The gun 14 is fitted with a welding nozzle 17, or shroud, at its end, and the nozzle 17 comprises a tubular part having a converging outer surface at the welding end. The nozzle 17 is also fitted with exit slots 18 to permit the escape of gases from the gun 14.

As successive welding operations proceed, weld spatter will generally accumulate around the inside of the welding nozzle 17, and the build-up will interfere with wire feed and cause blockage of gas flow.

A welding torch cleaner 19 is shown in the foreground of FIG. 1, and the device is affixed to a stationary base such as the box-like welding table 20 shown. The robot 10 may be programmed so that at appropriate intervals, when weld spatter buildup is expected to be at its maximum tolerable amount, the welding gun 14 and its attendant nozzle 17 may be positioned within the operating mechanism of the welding torch cleaner 19. The welding torch cleaner 19 has two main units fastened to a baseplate 21. The positioning and clamping unit 22 carried on the baseplate 21 has as its main parts, a V-block 23 for accurately positioning the outer diameter of the torch nozzle 17, and a movable clamp head 24 which is operated to clamp and unclamp the nozzle 17 in the cleaner 19. The reamer unit 25 is also secured to the baseplate 21, and has as its main element a rotatable reaming cutter 26 which is aligned coaxially with a clamped nozzle 17, and the reaming cutter 26 may be axially advanced into the bore of the nozzle 17 to machine away accumulated weld spatter. The baseplate 21 is, in turn, carried on a pair of angle brackets 27,28 which are affixed to the welding table 20 so that the cutter 26 will advance in a vertical direction. It should be noted that while a vertical attitude of the cutter 26 has been selected so that chip removal from the torch nozzle 17 will be facilitated by gravity, other attitudes are possible to suit the particular work environment, since industrial robots ae generally positionable to present the welding gun 14 in a variety of spatial orientations.

Figure 4:
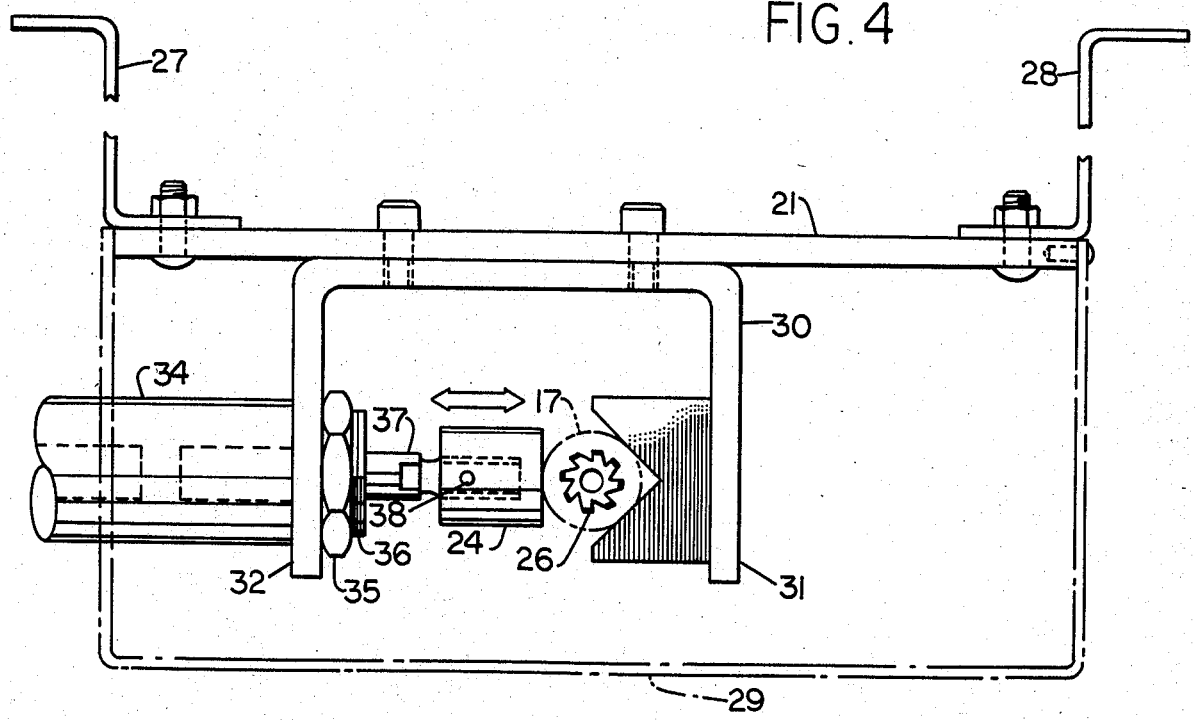
FIG. 4 is a top plan view of the welding torch cleaner.
Figure 2:
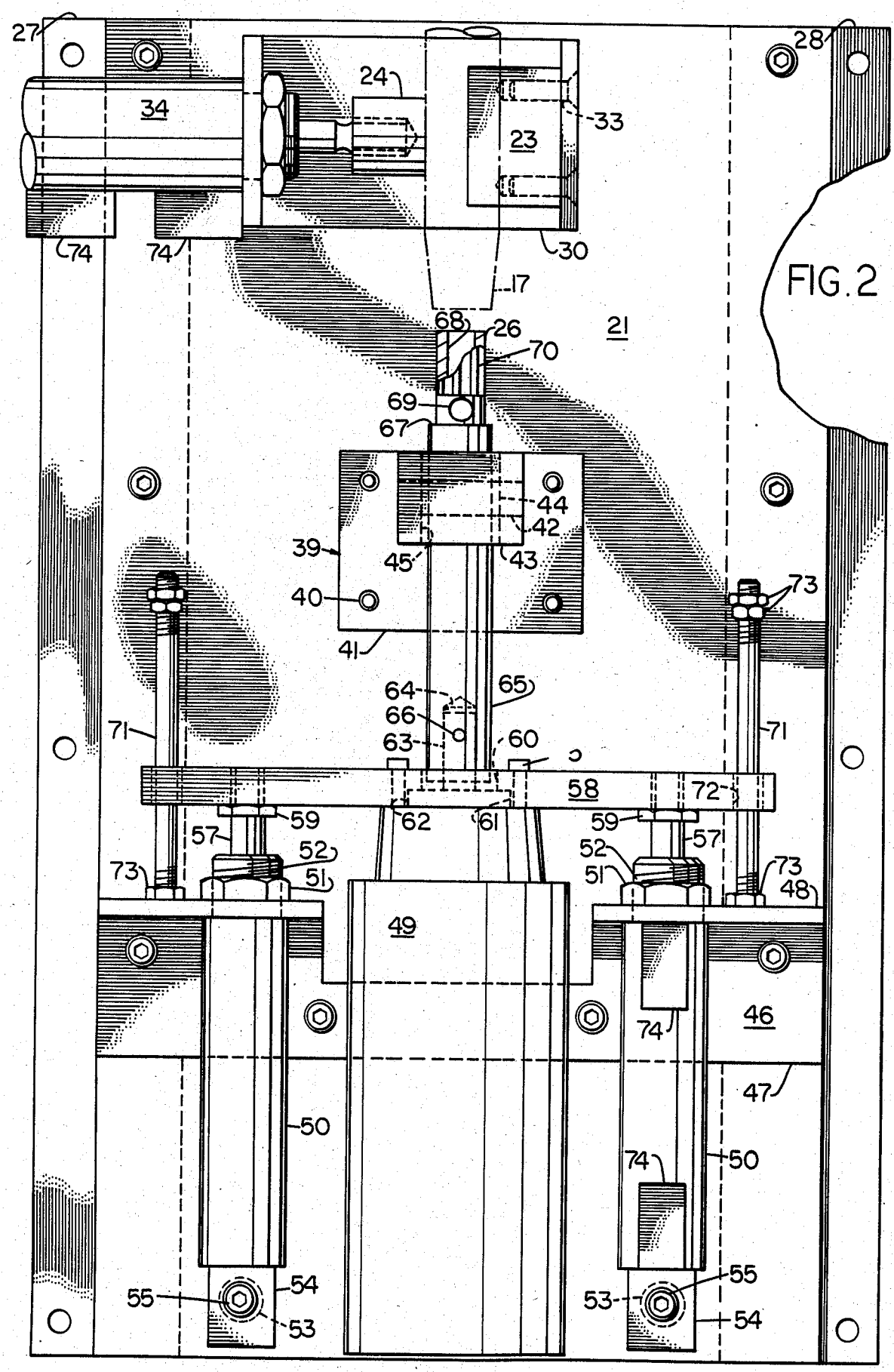
FIG. 2 is a front elevational view of the welding torch cleaner of FIG. 1.
Figure 3:
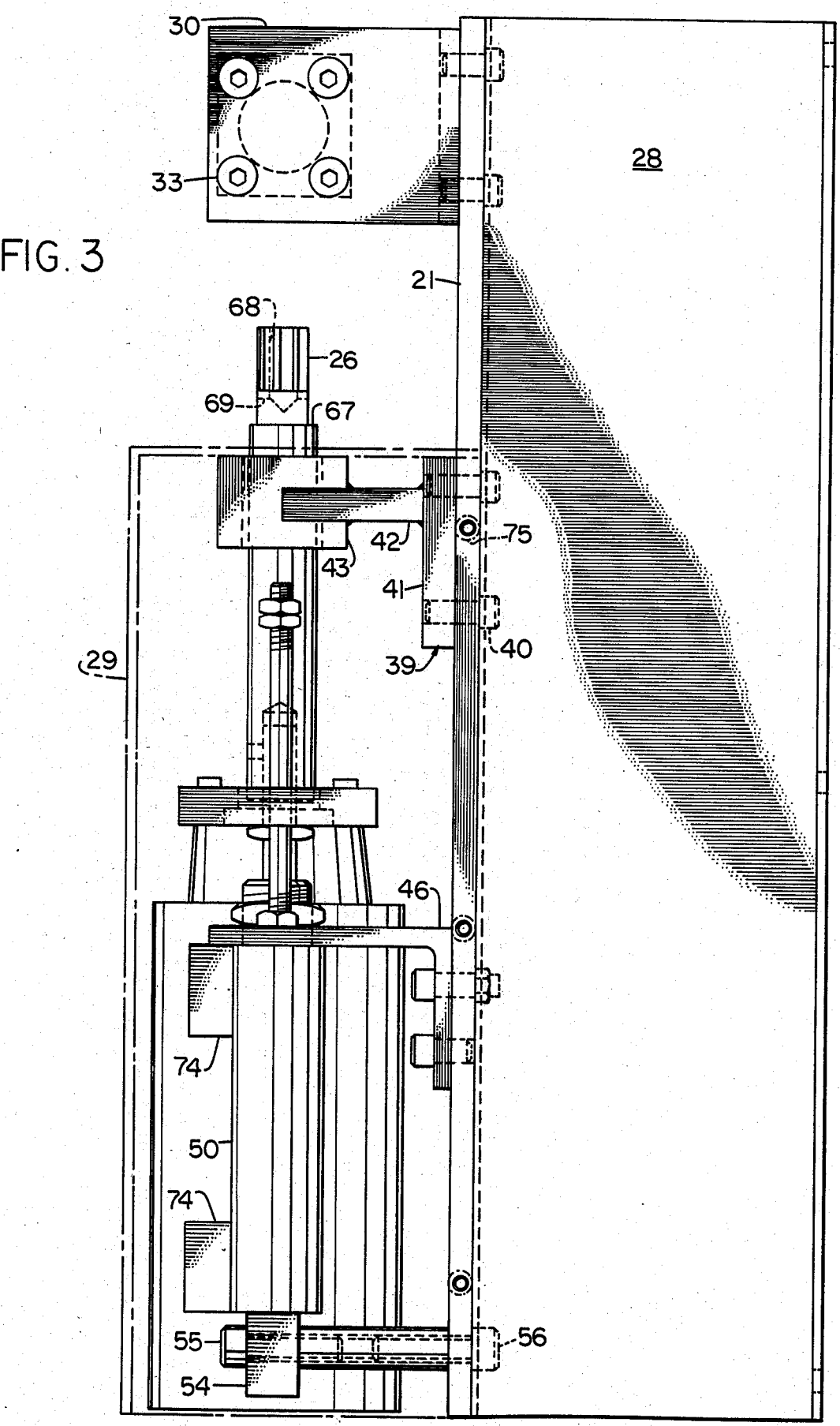
FIG. 3 is a right side elevational view of the welding torch cleaner.

Referring to FIGS. 2, 3, and 4, the front elevational view of FIG. 2 depicts the welding torch cleaner 19 with its cover 29 (see FIGS. 3 and 4) removed for clarity. The baseplate 21 is shown with a support bracket 30 affixed to its topmost section. The support bracket 30 is generally U-shaped with its legs 31,32 extending horizontally away from the baseplate 21 (see FIG. 4). The support bracket 30 carries a V-block 23 secured to one leg 31 by countersunk screws 33, and the V-supporting surfaces are aligned to be vertical. The other leg 31 of the support bracket 30 carries a pneumatic cylinder 34 in a horizontal attitude by means of a locknut 35 received on a threaded pilot diameter 36 of the cylinder 34 passing through the leg 31. The piston rod 37 of the cylinder 34 is threadably received in a clamp head 24 which is a cylindrical block having a set screw 38 received in its side. The clamp head 24 may thus be moved in horizontal directions toward and away from the V-block 23 to clamp and unclamp the robot-positioned torch nozzle 17.

Approximately midway down the baseplate 21 a bearing block 39 is positioned and locked to the baseplate 21 by screws 40. The bearing block 39 has a flat base 41 and upstanding web 42 which is welded to a cylindrical section 43 bored to receive a bearing 44. The bearing bore 45 is aligned with its axis in a vertical direction to be coaxial with the torch nozzle 17.

The baseplate 21 carries a feed support bracket 46 at approximately one-third of its length up from the bottom, and the bracket 46 is a 90 degree angle having one leg 47 secured to the baseplate 21 and having its other leg 48 extending horizontally across the baseplate 21. The center section of the feed support bracket 46 is machined, so that a central electric cutter drive motor 49 may be accommodated with clearance. Straddling the drive motor 49, a pair of feed cylinders 50 are received in the feed support bracket 46, and are secured therewith, by locknuts 51 threadably received on threaded pilots 52 extending through the support bracket 46. The lower end of the feed cylinders are supported by a tubular standoff 53 received between the baseplate 21 and the tang 54 of the feed cylinder 50. A first screw 55 is received through the tang 54 into the standoff 53, and a second screw 56 is received through the rear face of the baseplate 21 into the threaded standoff 53 to provide a rigid support for the feed cylinders 50. Upwardly-extending piston rods 57 are threadably received into a horizontal yoke bar 58 subtending the feed cylinders 50 and are secured with locknuts 59. The central portion of the yoke bar 58 is provided with a clearance hole 60 and a counterbore 61. The counterbore 61 receives the accurate pilot diameter 62 of the motor 49, and the motor shaft 63 extends upwardly through the clearance hole 60 into the bore 64 of a cutter shaft 65. A plurality of cap screws 76 are received through the top surface of the yoke bar 58 and are threadably received into the feed motor 49 for securing the bar 58 and motor 49 together. The cutter shaft 65 has a set screw 66 received therein to secure the shafts 63,65 together. The outer diameter of the cutter shaft 65 is machined to a precision fit with the bearing 44 of the bearing block 39, so that relative rotational and axial movement may occur between the cutter shaft 65 and bearing block 39. The top end of the cutter shaft 65 is machined to a reduced outer diameter terminating at an external shoulder 67 to form the integral reaming cutter 26. A central drilled hole 68 is provided in the top end of the cutter shaft 65 intersecting cross-drilled hole 69 provided in the shaft 65 at the shoulder 67. The reaming cutter 26 has a plurality of longitudinal serrations or teeth 70, which are suitable to remove weld spatter from the bore of the torch nozzle 17. The feed support bracket 46 has a pair of fixed vertical rods 71 extending from its horizontal leg 48, straddling the feed cylinders 50. The rods 71 are threaded at each end, and pass through clearance holes 72 in the yoke bar 58. The lower end is threadably received into the feed support bar 46 and secured with a locknut 73. The top end of the rod 71 is provided with a pair of lock nuts 73 which are positioned to provide a positive upward stop for the yoke bar 58 during the cutter operation.

Here it should be noted that the feed cylinders 50 are pneumatic cylinders, as is the clamp cylinder 34. Also, the cylinders 34,50 are provided with suitable external proximity switches 74, which are well-known in the art and are positionable on the outer surface of a given cylinder to indicate the extreme end positions of the piston.

FIG. 3 shows the reamer unit cover 29 in position and secured to the edges of the baseplate 21 by a plurality of screws 75.

OPERATION

The robot control (not shown) is preprogrammed to first position the torch nozzle 17 within the V-block 23 and then send an output signal to an air valve solenoid (not shown) to advance the clamp head 24 to hold the torch nozzle 17 firmly. The robot control will receive an input signal from the clamp cylinder proximity switch 74 that the clamp head 24 is in the forward position. Next, the robot control will send an output signal to both activate the cutter drive motor 49 and to actuate the feed cylinder air valve solenoid (not shown) to advance the yoke bar 58 and cutter shaft 65 vertically, thus moving the cutter 26 into the torch nozzle 17. The final upward position of the cutter is governed by the adjustable stop nuts 73 and, upon reaching them, the proximity switch 74 will signal that the robot control is to index to the remaining part of its program which, in turn, sequentially retracts the clamp head; retracts and stops the cutter; and then removes the welding torch from the V-block.

The cutter 26 is configured to suit the internal bore of the torch nozzle 17, and weld spatter which is machined free will fall into the drilled hole 68 and subsequently be discharged through the cross-drilled hole 69 of the cutter. Gravity will generally suffice for the removal of spatter chips, but discharge may be assisted by means of a air blast into the torch nozzle by way of the gas outlet slots 18.

While the invention has been shown in conjunction with a preferred embodiment depicted in the drawings, it is not intended that the invention be limited to such embodiment, but rather, the invention extends to all such designs and modifications as come within the scope of the appended claims.

What is claimed is:

1. An automatic welding torch cleaner, comprising:
   a base;
   a relatively rigid cutter rotatably carried on said base;
   means for rotating said cutter;
   means for reversibly moving said cutter along its axis of rotation on said base between advanced and retracted positions;
   means, mounted on said base, for linearly guiding said cutter while reversibly moving and for aligning said axis of rotation in a subtantially vertical attitude; and
   means, mounted on said base above said cutter in its retracted position, for aligning a welding torch coaxially with said cutter and for clamping said welding torch stationarily on said base with respect to said cutter.

2. The torch cleaners of claim 1, wherein said cutter has an axial hole interconnected to a radial hole to create a chip removal path from the bore of said welding torch as said cutter is in contact with said torch.

* * * * *